United States Patent [19]

Liedtke

[11] Patent Number: 5,378,743
[45] Date of Patent: Jan. 3, 1995

[54] STABLE LOW STYRENE EMISSION VINYL ESTER AND UNSATURATED POLYESTER RESIN COMPOSITION

[75] Inventor: Rolf F. Liedtke, Baden-Baden, Germany

[73] Assignee: The Dow Chemical Company, Midland, Mich.

[21] Appl. No.: 127,227

[22] Filed: Sep. 24, 1993

Related U.S. Application Data

[63] Continuation of Ser. No. 433,921, Nov. 8, 1989, Pat. No. 5,266,613.

[51] Int. Cl.$^6$ ............................................... C08L 67/06
[52] U.S. Cl. ................................... 523/523; 523/400; 523/464; 523/465; 523/500; 523/511
[58] Field of Search ............... 523/400, 464, 465, 500, 523/511, 523

[56] References Cited

U.S. PATENT DOCUMENTS

| | | | |
|---|---|---|---|
| 3,947,422 | 3/1976 | Tatum et al. | 280/42.52 |
| 4,201,826 | 5/1980 | Nylander | 428/288 |
| 4,269,745 | 5/1981 | Neumann | 260/23 P |
| 4,336,344 | 6/1982 | Craigie | 525/31 |
| 4,481,642 | 1/1985 | Atkins | 523/515 |
| 4,491,642 | 1/1985 | Atkins | 523/515 |
| 4,530,862 | 7/1985 | Alexander | 525/31 |
| 4,530,962 | 7/1985 | Alexander | 525/31 |
| 4,546,142 | 10/1985 | Walewski | 524/487 |
| 4,559,375 | 12/1985 | Schols et al. | 523/448 |
| 4,609,693 | 9/1986 | Schols et al. | 523/465 |
| 4,619,953 | 10/1986 | Schols et al. | 523/465 |

FOREIGN PATENT DOCUMENTS

| | | |
|---|---|---|
| 0000941 | 3/1979 | European Pat. Off. . |
| 0008216 | 2/1980 | European Pat. Off. . |
| 0027666 | 4/1981 | European Pat. Off. . |
| 0072114 | 2/1983 | European Pat. Off. . |
| 2554930 | 6/1977 | Germany . |
| 2011918 | 7/1979 | United Kingdom . |
| 2052545 | 1/1981 | United Kingdom . |
| 2065683 | 7/1981 | United Kingdom . |
| 2182341 | 5/1987 | United Kingdom . |

*Primary Examiner*—Edwards J. Cain
*Attorney, Agent, or Firm*—Norman L. Sims; Thomas Ladd

[57] ABSTRACT

This invention relates to a stable, low level styrene emission vinyl ester or unsaturated polyester resin composition containing a nonionic surfactant or a copolymer of maleic acid half ester of a polyethylene glycol and a monoalkenyl aromatic monomer as stabilizing agents.

18 Claims, No Drawings

STABLE LOW STYRENE EMISSION VINYL ESTER AND UNSATURATED POLYESTER RESIN COMPOSITION

This is a continuation of application Ser. No. 07/433,921 filed Nov. 8, 1989, now U.S. Pat. No. 5,266,613.

BACKGROUND OF THE INVENTION

Vinyl ester resins and unsaturated polyester resins are industrially important in the manufacture of reinforced plastic components, boat hulls, fireproof molded articles, linings, paints, coating compositions, tanks, vessels, scrubbers, smoke stacks, pipe linings and other composite materials. Where superior toughness and corrosion resistance is desired, the more resistant vinyl ester resins are generally employed. These resins are generally prepared and mixed with a polymerizable monomer such as styrene, in order to reduce their viscosity. When cured, the styrene becomes a part of the resin system to produce a rigid cross-linked structure with desirable properties.

The presence of large amounts of styrene in such resin compositions results in the emission of styrene vapors into the work atmosphere, which constitutes a hazard to workers. In view of this workplace hazard, certain threshold concentration limits for styrene vapor have been established in many countries. Several methods of reducing styrene emission are described in the literature. One such method, described by Nylander in U.S. Pat. No 4,201,826, includes the addition of a film-forming material, such as a paraffin or hydrocarbon wax, to resin compositions in order to inhibit the vaporization of styrene. Paraffin or hydrocarbon waxes tend to migrate to the surface of the resin and serve as a film barrier which confine the styrene monomer within the resin.

While such systems successfully suppress the volatilization of styrene from the work atmosphere, laminates so prepared are deficient in their secondary bonding characteristics. For example, applications in which relatively thick reinforced plastic articles are produced, are generally prepared in several laminate passes with successive curings. Thus, one or more impregnated reinforced layers is applied and allowed to cure, followed by another series of applied reinforced layers, with further curing, etc. It is necessary that each successive layer forms a tight bond to the preceding layer. Paraffin and hydrocarbon waxes form surface films which are extremely useful in controlling styrene emissions. However, the wax surface films they produce effectively reduce adhesion. Therefore, it is not too surprising that they also impart a substantial loss in adhesive properties of the resin to the reinforcing medium, as well as to secondary bonds formed by multiple-pass laminations.

Various adhesion promoters are known to the art which improve the adhesion of resin mixtures to reinforcing medium, as well as to resin laminates themselves, as in the case of multi-pass laminates. In general, however, these adhesion promoters are only partially soluble in styrene containing resin compositions, and soon separate upon standing to form bi-phasic mixtures. Accordingly, in many instances, adhesion promoters are added just prior to using the resin mixtures, in order to avoid their separating and floating to the top of the resin composition. It would be highly advantageous to be able to provide a complete resin system, containing the resin, styrene wax and adhesion promoter, which has a low styrene emission, and which will not separate on standing.

SUMMARY OF THE INVENTION

The present invention stems from the discovery that when a nonionic surfactant or a copolymer formed by a maleic acid half ester of a polyethylene glycol, having a molecular weight about 1450 to 6000, and a monoalkenyl aromatic monomer is added to a mixture of a vinyl ester resin or an unsaturated polyester resin containing a polymerizable monomer such as styrene, a paraffin wax and an adhesion promoter, a stable resin composition is obtained that does not separate on standing.

In addition, resin systems are described which do not contain adhesion promoters, but which demonstrate reduced polymerizable monomer emission.

DETAILED DESCRIPTION OF THE INVENTION

The present invention relates to stable resin compositions having low emission of the polymerizable monomer styrene comprising: (1) a vinyl ester or an unsaturated polyester resin; (2) a polymerizable monomer; (3) a film forming wax material as a polymerizable monomer inhibition emission inhibitor; (4) an adhesion promoter; and (5) a nonionic surfactant or copolymer of a maleic acid half ester of a polyethylene glyol and a monoalkenyl aromatic monomer.

The vinyl ester resins that can be employed in accordance with the teachings of the present invention are prepared (1) by reacting a polyepoxide with an ethylenically unsaturated carboxylic acid to produce a reaction product which contains, in part, the functional group

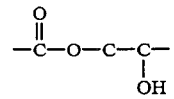

produced by the interaction of an epoxide group with a carboxylic acid group, or (2) by further condensation of the secondary hydroxyl groups contained in the above reaction product with a dicarboxylic acid anhydride to produce pendant half ester groups. The resulting vinyl ester resins can then be admixed with a polymerizable monomer containing a $>C=CH_2$ group. In the first stage of the resin preparation, the polyepoxide is added in an amount sufficient to provide from about 0.8 to 1.2 equivalents of epoxide per equivalent of carboxylic acid. If desired, the further condensation of the secondary hydroxyl groups is completed by the addition of a dicarboxylic acid anhydride to form pendant half ester groups with the secondary alcohol group generated from the epoxide-carboxylic acid reaction. The proportion of this added dicarboxylic acid anhydride can be varied to convert any or all of the secondary hydroxyl groups to pendant half ester groups.

Ethylenically unsaturated carboxylic acids that are suitable for reaction with the polyepoxide include the $\alpha,\beta$-unsaturated monocarboxylic acids and the hydroxyalkyl acrylate or methacrylate half esters of dicarboxylic acids. The $\alpha,\beta$-unsaturated monocarboxylic acids include such acids as acrylic acid, methacrylic acid, crotonic acid, cinnamic acid and the like. The hydroxylalkyl group of the acrylate or methacrylate half esters preferably may contain from two to six carbon atoms and includes such groups as hydroxyethyl, beta-hydroxy-propyl, beta-hydroxybutyl and the like. It is also intended to include those hydroxyalkyl groups in which an ether oxygen is present. The dicarboxylic acids can be either saturated or unsaturated in nature. Saturated acids include phthalic acid, chlorendic acid, tetrabromophthalic acid, adipic acid, succinic acid, glutaric acid and the like. Unsaturated dicarboxylic acids include maleic acid, fumaric acid, citraconic acids, itaconic acid, halogenated maleic or fumaric acids, mesaconic acid and the like. Mixtures of saturated and ethylenically unsaturated dicarboxylic acids can be employed.

The half esters preferably employed are prepared by reacting substantially equal molar proportions of a hydroxyalkyl acrylate or methacrylate with a dicarboxylic acid anhydride. Other unsaturated anhydrides that can be employed include maleic anhydride, citraconic anhydride, itaconic anhydride and the like; preferred saturated anhydrides that can be employed include phthalic anhydride, tetrabromophthalic anhydride, chlorendic anhydride and the like. Advantageously, a polymerization inhibitor, such as the methyl ether of hydroquinone or hydroquinone, may be added inasmuch as elevated temperatures are useful in preparing the half esters.

Any of the known polyepoxides can be employed in the preparation of the vinyl ester resins of this invention. Useful polyepoxides are glycidyl polyethers of both polyhydric alcohols and polyhydric phenols, epoxy novolacs, elastomer modified epoxides, halogenated epoxides, epoxidized fatty acids or drying oil acids, epoxidized diolefins, epoxidized di-unsaturated acid esters, epoxidized unsaturated polyesters and mixtures thereof, as long as they contain more than one epoxide group per molecule. The polyepoxides may be monomeric or polymeric in nature.

While the invention is applicable to polyepoxides in general, the preferred polyepoxides include glycidyl polyethers of polyhydric alcohols or polyhydric phenols, having weights per epoxide group of 150 to 2,000. These polyepoxides are usually made by reacting at least about two moles of an epihalohydrin or glycerol dihalohydrin with one mole of the polyhydric alcohol or polyhydric phenol and a sufficient amount of caustic alkali to combine with the halogen of the halohydrin. The products are characterized by the presence of more than one epoxide group, i.e. a 1,2-epoxy equivalency greater than one.

Suitable dicarboxylic acid anhydrides for reaction with the secondary hydroxyl groups include both the saturated anhydrides, such as phthalic anhydride, tetrabromophthalic anhydride, chlorendic anhydride and the like, and the $\alpha,\beta$-unsaturated dicarboxylic acid anhydrides, such as maleic anhydride, citraconic anhydride, itaconic anhydride and the like.

A wide selection of polymerizable monomers containing a $>C=CH_2$ group is available from the many known classes of vinyl monomers. Preferred polymerizable monomers are styrene, vinyl toluene, ortho-, meta-, and parahalostyrenes, vinyl naphthalene, the various alpha-substituted styrenes, as well as the various di-, tri- and tetra-halostyrenes and acrylic, methacrylic and crotonic acid esters, which include both the saturated alcohol esters and the hydroxyalkyl esters. Styrene is the preferred copolymerizable monomer. Generally, the polymerizable monomer is present in amounts ranging from about 20 to 60 weight % of the vinyl ester resin composition depending upon the particular properties desired.

In the preparation of the vinyl ester resins, various inhibitors and catalysts may be used. Any of the well known vinyl polymerization inhibitors, such as hydroquinone or the methyl ether of hydroquinone and the like, can be used. Additionally, the reaction of the polyepoxide with the carboxylic acid may be conducted either in the presence or absence of a catalyst such as alcoholates, tertiary-amino phenols and the like.

The preferred vinyl ester resins employed in the practice of the present invention are the DERAKANE* vinyl ester resins. Even more preferred is the general purpose resin known as DERAKANE 411-45 vinyl ester resin, which contains approximately 45% monomeric styrene. Other DERAKANE vinyl ester resins that can be employed, for example, include: DERAKANE 411-C-50

* Trademark of The Dow Chemical Company vinyl ester resin, containing approximately 50% monomeric styrene; DERAKANE 470-36 vinyl ester resin, containing approximately 36% monomeric styrene; DERAKANE 470-30 vinyl ester resin, containing approximately 30% monomeric styrene; DERAKANE 510-A-40 vinyl ester resin, a brominated vinyl ester resin containing approximately 40% monomeric styrene; DERAKANE 790 vinyl ester resin, containing approximately 45% monomeric styrene; and DERAKANE 8084 vinyl ester resin, a flexibilized vinyl ester resin containing approximately 40% monomeric styrene.

Unsaturated polyester resins used in reinforced plastics are well-known to the art. Generally, they are prepared by reacting unsaturated dibasic acids with dihydric alcohols and dissolving the resulting mixture in a reactive solvent. The unsaturated dibasic acids or acid anhydrides generally employed are dicarboxylic acids, as for example, phthalic acid, phthalic anhydride, terephthtalic acid, adipic acid, succinic acid, mellitic acid, tetrahydrophthalic anhydride, halogenated phthalic acids. Maleic acid, maleic anhydride, fumaric acid, citraconic, itaconic acids, nadic anhydride are examples of ethylenically unsaturated dicarboxylic acids that can be employed. Typical polyhydric alcohols that may be employed include glycols and glycol ethers such as ethylene glycol, propylene glycol, butylene glycol, diethylene glycol, dipropylene glycol, polyethylene glycol and polypropylene glycol.

Other unsaturated polyester resins employed in the practice of this invention include reaction products of monoethylenically unsaturated carboxylic acids with diols or diol precursors, such as bisphenol-A or bisphenol-A diglycidyl ethers. In general, the unsaturated polyester resins are combined with a polymerizable monomer to form a low viscosity resin. The polymerizable monomer generally comprises a copolymerizable ethylenically unsaturated monomer, predominantly styrene, although other polymerizable monomers can be employed such as vinyl toluene, divinyl benzene, alpha methyl styrene, orthochloro styrene, acrylic acid, methacylic acid, maleate esters, acrylic esters, methacrylic esters and the like. In general, polyester resins containing from about 25 to 55% by weight of styrene and from about 45 to 75% by weight of unsaturated polyester resin are favorably employed. The preferred unsaturated polyester resins employed in the practice of the present invention are the unsaturated isophthalic polyester resins containing styrene as the copolymerizable monomer. A ratio of about 1 part by weight of styrene to about 2 parts by weight of resin is generally utilized.

In addition to the polymerizable ingredients hereinabove recited, vinyl ester resins and unsaturated polyester resins customarily contain small but effective quantities of polymerization inhibitors such as quinones or catechols; polymerization promoters such as cobalt or vanadium salts; thixotropic agents such as fumed silica and modified fumed silica, carboxy cellulose; pigments; inert fillers such as silica, calcium carbonate, titanium dioxide, magnesium oxide; and fibrous reinforcing material such as randomly oriented glass fibers or woven glass fabrics.

The present low styrene emission resin compositions employ a film forming wax material comprising essentially a paraffin wax or mixture of paraffin waxes to reduce the emission of styrene into the work environment. The preferred film forming wax materials employed are the paraffin type waxes. Still more preferred are the ceresin waxes. Ceresin waxes are hydrocarbon waxes having a microcrystalline structure and comprising a mixture of long chain hydrocarbon molecules having branched and unbranched carbon chains. In the practice of the present invention the ceresin waxes are preferred due to their greater efficiency in reducing styrene emission. The waxes and wax mixtures of the present invention have a mpt of 50°–95° C. and a congealing point of 48°–85° C. At 100° C. the viscosity of these waxes is from 3 to 11 mPa.s as measured with a Brookfield 18/60 viscometer. The penetration value at 25° C. is 5 to 50 mm as measured by ASTM D-1321.

Other waxy materials, such as stearic acid, stearyl stearate, carnauba wax and montan wax can be employed in the practice of this invention, either per se or as mixtures thereof together with other paraffin waxes, in order to reduce styrene volatilization. Generally from 0.01 to 2% of wax or waxy material is employed, based upon the weight of the vinyl ester or unsaturated polyester resin and polymerizable monomer employed. Preferably from 0.05 to 0.5 of ceresin wax is employed for finished resin compositions, either with or without adhesion promoters.

One of the drawbacks in using film forming wax materials is the undesirable reduction in adhesive bond strength that occurs between reinforcement materials and resin compositions containing such waxy materials. Adhesive bond strength can be qualitatively measured by examining the amount of fibers that are present in the break pattern of a resin laminate. In other words, when a force is applied which causes the laminate to break, the greater number of fibers that appear in the break surface, the greater is the resin adhesive bond strength. If on the other hand, the break surface is clean and cleaves generally parallel to the flat surface of the laminate, the resin adhesive bond strength is poor.

Various adhesion promoters are known which can be added to wax containing resins in order to improve their adhesive bond strength. Thus, for example, lanolin, described in U.S. Pat. No. 4,559,375; drying oils, described in U.S. Pat. No. 4,609,693; alkylaromatic, alkenylaromatic, alkylolaromatic and alcohol compounds, described in European Patent Application 0 027 666; stearyl and lauryl methacrylates, described in European Patent Application 0 008 216; and lauric acid-/allyl glycidyl ether reaction products, described in European Patent Application 0 072 114, have all been favorably employed as adhesion promoters and can all be used in the practice of the present invention.

However, the preferred adhesion promoters employed in the practice of this invention are the class of alkyl esters of acrylic acid and their copolymers having the general formula

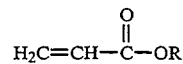

wherein R is a $C_1$ to $C_{16}$ alkyl or branched alkyl carbon chain. Preferably, the R group is a $C_4$ to $C_8$ alkyl or branched alkyl chain. Still more preferred are the polyalkyl esters of acrylic acid, such as polybutylacrylates and polyethylhexylacrylates. The use of these polyacrylate esters as adhesion promoters is fully described in U.S. Pat. No. 4,619,953, which is incorporated herein by reference.

Although adhesion promoters effectively recapture some of the bond strength which is sacrificed by the addition of a film forming waxy material to resin compositions, most adhesion promoters suffer from the disadvantage that they are only partially soluble in resin mixtures containing styrene and will separate on standing. Thus, adhesion promoters are often added just prior to use, and mixed into resin containing styrene mixtures together with activating catalysts and any other excipients that may be employed. This is not always conveniently done at the job site. Thus, it would be highly desirable to have a resin composition containing all of the ingredients, with the exception of the activating catalyst, that could be pre-mixed by a resin manufacturer or supplier, and that would be storage stable and not separate on standing.

Applicant has discovered that the use of a relatively small amount of a stabilizer selected from the group of nonionic surfactants and a copolymer of maleic acid half ester of a polyethylene glycol of a monoalkenyl aromatic monomer provides a stable resin mixture in the presence of an adhesion promoter which is storage stable and which will not separate on standing.

The term nonionic surfactant as used herein include the polyoxyethylene-polyoxypropylene block polymers, alkyl polyoxyethylene, alkyl sorbitan polyoxyethylene, and alkyl aryl polyoxyethylene polymers, alkamine oxides, acetylenic glycols, fatty acid amides and polyglyceryl fatty acid esters.

The preferred nonionic surfactants are the polyoxyethylene-polyoxypropylene block copolymers. More particularly, these block copolymers have a molecular weight of from 1,000 to 17,000 wherein the total amount of hydrophilic groups range from 10 to 30 80% of polyoxyethylene polymer and the total amount of the hydrophobic groups range from 20 to 90% of polyoxypropylene polymer. These surfactants can be liquids, semisolids or solids, thereby providing a wide range of balanced physical properties.

All series of DOWFAX* surfactant block copolymers sold by The Dow Chemical Company are particularly useful as stabilizers. These compounds are produced by the copolymerization of propylene oxide and ethylene oxide, resulting in the combination of a hydrophobic polyoxypropylene block (molecular weight greater than 900) and hydrophilic polyoxyethylene blocks within the same molecule. By varying the proportion of ethylene oxide to propylene oxide, as well as the manipulation of the molecular weight, it is possible to manufacture a wide range of surfactant products. DOWFAX 30 605 nonionic surfactant is particularly useful in the practice of this invention. This surfactant has a molecular weight of about 3,000; a pour point of −30° C.; a specific gravity of 1.014; a viscosity of 740 cP at 25° C. and an ethylene oxide content of about 5%.

The preferred stabilizers are copolymers of maleic acid half ester with a polyethylene glycol and a monoalkenyl aromatic monomer. More particularly, the copolymers comprise about 0.5 to 2 moles of the maleic acid half ester per 100 moles of the aromatic monomer. The molecular weight can be varied by changing the catalyst level (molecular weight decreases as catalyst level increases) and/or by changing the polymerization temperature (increasing the temperature decreases the molecular weight). The copolymer should have an average molecular weight of at least about 15,000 and can be as high as 50,000. A preferred molecular weight range for the copolymer is from about 18,000 to 30,000. The preferred glycol employed is a polyethylene glycol having an average molecular weight between 1450 and 6000. The monoalkenyl aromatic monomers employed are well known and include styrene, vinyl toluene, t-butyl styrene, α-methyl styrene and the like. In general, styrene is utilized. These copolymers were originally developed to lower the viscosity of low profile bulk and sheet molded articles, and are fully described in U.S. Pat. No. 3,947,422 which is incorporated herein by reference. Preferably, a copolymer having an average molecular weight of about 29,000, comprising a maleic acid half ester of polyethylene glycol with an average molecular weight of about 4000 and styrene is employed.

As previously indicated, vinyl ester resin or polyester resin compositions containing a polymerizable monomer, a film forming waxy material and an adhesion promotor soon separate on standing. Unexpectedly, I have discovered that the addition of a small amount of stabilizer to such compositions provides a homogeneous suspension which does not separate on standing. The stabilizers can be added to such resin compositions in amounts ranging from 0.05 to 5% based upon the total resin compositions. Preferably, amounts of stabilizer ranging from 0.1 to 1.0% of the total resin mixture are favorably employed.

It is obvious that the stabilizers need not be added solely to the finished resin system. They can also be added to various components of the resin system or pre-mixes which can then be added, with or without dilution, to the remaining components to form the final resin compositions. Thus, for example the stabilizer, adhesion promoter and film forming wax material can be supplied as a pre-mix for addition to both a vinyl ester or an unsaturated polyester resin in combination with a polymerizable monomer. Alternatively, the stabilizer and film forming wax material, or stabilizer and adhesion promoter, can be dissolved in a solvent, such as styrene, and separately supplied as a stabilizing pre-mix solution for addition to vinyl ester or unsaturated polyester resin systems. Such combinations merely reflect alternative methods for the utilization of this invention, which are known to those skilled in the art, and which are deemed to be fully within the scope of the invention claimed.

Unexpectedly, I have further discovered that if the stabilizer is added to a wax containing vinyl ester resin or polyester resin containing styrene as the polymerizable monomer, in the absence of an adhesion promoter, an enhancement in the reduction of styrene emission occurs, which is above and beyond that attributable to the film forming wax alone. However, this effect is observed only in low wax resin compositions wherein the wax is present from about 0.05 to 2.0% by weight of the total resin composition. The greatest reduction of styrene emission occurs at a wax concentration of from 0.05 to 0.5% by weight of the total composition. It is not understood why a non-film forming material should further reduce styrene emissions, but the results are quite dramatic. Thus at wax concentrations of 0.075% in the absence of an adhesion promoter, the addition of from 0.05 to 2.0% by weight of stabilizer results in an additional 20 to 30% reduction in styrene emission over and above that produced by the paraffin or hydrocarbon wax film forming material alone.

As indicated, this phenomenon is not observed in the presence of adhesion promoters. Thus, only resin compositions which do not require any adhesion promoters can take advantage of this enhanced reduction of styrene emission. Such resin compositions are of particular use in reinforced resin applications which involve only an initial lay-up, as for example pipes and tanks, centrifugally coated pipes and tanks, and single-pass, lay-up laminate structures.

Other materials such as low profile additives, polymerization inhibitors, curing accelerators, mold release agents, polymerization catalysts or catalyst initiator packages can be added to such compositions without departing from the spirit of the invention.

The invention described and claimed herein is more particularly illustrated in conjunction with the following examples, which are not intended to limit the invention in any way.

EXAMPLE 1

This example illustrates a method for preparing the preferred copolymer stabilizer of this invention. Maleic acid half ester is prepared by reacting one mole of maleic anhydride with one mole of a polyglycol having an average molecular weight of about 4000 (E-4000). The glycol is first dried by azeotropically removing the water with toluene. The reaction is conducted under a nitrogen pad for 1.5 to 3 hours at 100°–110° C. When the acid content ceases to decline, the half ester preparation is complete. The resulting half ester is a 25% solution in toluene.

The copolymer is prepared in a suitable reactor by charging 82 g of the half ester solution, 208.3 g of styrene and 208.3 g of toluene. After heating to 100° C., 2.1 g of benzoyl peroxide (98%) is added, and heating continued and controlled at between 110° C. and 115° C. for about 1 hour. An additional 82 g of half ester solution is added and digested for another 30 minutes at this temperature. The toluene is stripped off by an air purge which further helps to stop any further polymerization. When the reactor temperature reaches 140° C. the air purge is stopped and a vacuum applied to remove traces of toluene, etc. The reaction temperature is cooled to 120° C. at which time the copolymer can be diluted with 677 g of styrene (inhibitor added) for subsequent addition to the vinyl ester resin. The copolymer so produced is prepared from a total of about 0.02 moles of the half ester and 2 moles of styrene, and has a weight average molecular weight of about 29,000.

EXAMPLE 2

The following example describes the stabilizing effect of the stabilizing agent upon vinyl ester and polyester resin compositions.

The resin compositions shown below are weighed into a container, heated to approximately 65°–70° C., mixed to form a homogeneous suspension, allowed to cool and placed on a shelf where they remain undisturbed at a temperature of 25° C. The samples are inspected daily for a minimum of ten days. The first evidence of bi-phasic separation is taken as an endpoint of stability.

| Components | Amounts (g) | | | | | |
|---|---|---|---|---|---|---|
| Resin A[1] | 99.4 | 98.9 | | | | |
| Resin B[2] | | | 95.0 | 95.0 | 99.4 | 98.9 |
| Ceresin wax (mp 60–65° C.) | 0.1 | 0.1 | 0.1 | 0.1 | 0.1 | 0.1 |
| Polybutylacrylate | 0.5 | 0.5 | 0.5 | 0.5 | 0.5 | 0.5 |
| Stabilizer[3] | — | 0.5 | — | 0.5 | — | 0.5 |
| Phase Stability (days) at 25° C. | 2 | 8 | <1 | >20 | | |
| Phase Stability (days) at 55° C. | — | | <1 | >7 | <1 | >5 |

EXAMPLE 3

Following the same procedure as in Example 2, but varying the concentration of the stabilizing agent, the following results are observed:

| Components | Amounts (g) | | | |
|---|---|---|---|---|
| Resin B[2] | 99.3 | 98.8 | 98.3 | 97.8 |
| Ceresin wax (mp 60–65° C.) | 0.2 | 0.2 | 0.2 | 0.2 |
| Polybutylacrylate | 0.5 | 0.5 | 0.5 | 0.5 |
| Stabilizer[3] | — | 0.5 | 1.0 | 1.5 |
| Phase Stability (days) at 25° C. | <1 | >10 | >10 | >10 |

[1] - Resin A = NORSODYNE G-703 unsaturated isophthalic polyester resin, a trademark of CdF Chemie
[2] - Resin B = DERAKANE 411-45 vinyl ester resin, a trademark of The Dow Chemical Company
[3] - The copolymer prepared in accordance with Example 1

EXAMPLE 4

The stabilizing effect of this composition can also be demonstrated by means of an accelerated test method.

An 83 mm long test tube, having a diameter of 12 mm is filled with 73 mm of the resin suspension and centrifuged at 4000 rpm for 4 hours. The separation of the upper layer, if any, is measured in millimeters.

| Components | Amounts (g) | | | |
|---|---|---|---|---|
| Resin B[2] | 99.4 | 98.9 | | |
| Resin C[4] | | | 95.0 | 95.0 |
| Ceresin wax (mp 60–65° C.) | 0.1 | 0.1 | 0.1 | 0.1 |
| Polybutylacrylate | 0.5 | 0.5 | 0.5 | 0.5 |
| Stabilizer[3] | — | 0.5 | — | 0.5 |
| Phase Separation (mm) | 1.0 | 0 | 0.5 | 0 |

[2] - Resin B = DERAKANE 411-45 vinyl ester resin
[3] - The copolymer prepared in accordance with Example 1
[4] - Resin C = DERAKANE 470-36, vinyl ester resin, a trademark of The Dow Chemical Company

EXAMPLE 5

Following the same procedure as in Example 4, but varying the concentration of the stabilizing agent, the following results were obtained:

| Components | Amounts (g) | | |
|---|---|---|---|
| Resin B[2] | 99.3 | 98.9 | 94.4 |
| Ceresin wax (mp 60–65° C.) | 0.1 | 0.1 | 0.1 |
| Polybutylacrylate | 0.5 | 0.5 | 0.5 |
| Stabilizer[3] | 0.1 | 0.5 | 5.0 |
| Phase Separation (mm) | 0.1 | 0 | 0 |

[2] - Resin B = DERAKANE 411-45 vinyl ester resin
[3] - The copolymer prepared in accordance with Example 1

EXAMPLE 6

The following example demonstrates the enhanced reduction of styrene emission by the stabilizing agent in a wax containing vinyl ester resin composition that does not contain an adhesion promoter.

The test procedure involves pouring 200 g of the resin composition into a circular galvanized steel plate having a diameter of 240 mm and a depth of 7 mm. The disk is placed on a balance with a resolution of ±0.01 g. To avoid faulty readings due to air turbulance, the balance is placed in a closed fume cabinet. The loss in weight is determined after 15 minutes and calculated as weight loss in grams per square meter. The temperature is maintained constant within the range of 22° to 24° C.

| Components | Amounts (g) | | | | | | |
|---|---|---|---|---|---|---|---|
| Resin B[2] | 100 | 99.925 | 99.875 | 99.825 | 99.425 | 97.925 | 95.925 |
| Ceresin wax (mp 60–65° C.) | — | 0.075 | 0.075 | 0.075 | 0.075 | 0.075 | 0.075 |
| Stabilizer[3] | — | — | 0.05 | 0.1 | 0.5 | 2.0 | 4.0 |
| Styrene emission (g/m²) | 26.7 | 23.1 | 16.6 | 16.1 | 23.8 | 25.2 | 34.9 |

[2] - Resin B = DERAKANE 411-45 vinyl ester resin
[3] - The copolymer prepared in accordance with Example 1

This experiment demonstrates that at low wax concentrations, styrene emissions are reduced an additional 28-30 % at stabilizer concentrations of from 0.05–0.1%.

EXAMPLE 7

Following essentially the same procedure as in the preceeding example, but substituting an unsaturated isophthalic polyester resin for the vinyl ester resin, the following results are obtained:

| Components | Amounts (g) | | | | | |
|---|---|---|---|---|---|---|
| Resin D[5] | 100 | 99.925 | 99.825 | 99.425 | 97.925 | 95.925 |
| Ceresin wax (mp 60–65° C.) | — | 0.075 | 0.075 | 0.075 | 0.075 | 0.075 |
| Stabilizer[3] | — | — | 0.1 | 0.5 | 2.0 | 4.0 |
| Styrene emission (g/m²) | 20 | 6.3 | 5.5 | 5.5 | 5.1 | 10.1 |

These data show that at low wax concentrations, styrene emissions are reduced an additional 12-19 % at stabilizer concentrations of from 0.1 to 2.0%.

EXAMPLE 8

The following example illustrates that styrene emissions are not increased by the addition of a stabilizer to a wax containing vinyl ester or unsaturated polyester resin compositions containing adhesion promoters.

Following essentially the same procedure as set forth in example 6, the following data are obtained.

| Components | Amounts (g) | | | | | |
|---|---|---|---|---|---|---|
| Resin B[2] | 100 | 99.725 | 99.675 | 99.525 | 98.725 | 95.725 |
| Ceresin wax (mp 60-65° C.) | — | 0.075 | 0.075 | 0.075 | 0.075 | 0.075 |
| Polybutylacrylate | — | 0.2 | 0.2 | 0.2 | 0.2 | 0.2 |
| Stabilizer[3] | — | — | 0.05 | 0.2 | 1.0 | 4.0 |
| Styrene emission (g/m[2]) | 20 | 14.2 | 12.5 | 14.2 | 15.9 | 15.4 |

[2] - Resin B = DERAKANE 411-45 vinyl ester resin
[3] - The copolymer prepared in accordance with Example 1
[5] - Resin D = LEGUVAL W25 unsaturated isophthalic polyester resin, trademark of Bayer Following essentially the same procedure as above, but substituting a nonionic surface active agent for the copolymer of maleic acid half ester of a polyethylene glycol and styrene prepared in accordance with Example 1, the following data are obtained:

| Components | Amounts (g) | | | | | |
|---|---|---|---|---|---|---|
| Resin B[2] | 100 | 99.725 | 99.675 | 99.625 | 99.225 | 95.725 |
| Ceresin wax (mp 60-65° C.) | — | 0.075 | 0.075 | 0.075 | 0.075 | 0.075 |
| Polybutylacrylate | — | 0.2 | 0.2 | 0.2 | 0.2 | 0.2 |
| Stabilizer[6] | — | — | 0.05 | 0.1 | 0.5 | 4.0 |
| Styrene emission (g/m[2]) | 20 | 9.9 | 6.3 | 7.7 | 7.0 | 14.7 |

[2] - Resin B = DERAKANE 411-45 vinyl ester resin
[6] - DOWFAX 30 C05 = nonionic surface active agent, trademark of The Dow Chemical Company

EXAMPLE 9

The following example illustrates that other properties such as interlaminar shear strength are not adversely effected by the particular stabilizer used in the present invention.

An eight layer laminate containing approximately 30% glass fiber and 70% resin mixture is prepared. One hundred grams of the composition tested is cured with 0.3 g of cobalt octoate (6 %), 0.1 g of dimethylaniline and 1.5 g of methyl ethyl ketone peroxide (50%). The interlaminar shear strength is measured in accordance with ASTM D 2344. The following results are obtained for a vinyl ester resin formulation that does not contain an adhesion promoter, following a 45 hours cure at room temperature.

| Components | Amounts (g) | |
|---|---|---|
| Resin B[2] | 100 | 99.4 |
| Ceresin wax (mp 60-65° C.) | — | 0.1 |
| Stabilizer[3] | — | 0.5 |
| Interlaminar shear strength (MPa) | 22.3 | 21.0 |

Following essentially the same procedure, but adding an adhesion promoter, the following results 10 are obtained:

| Components | Amounts (g) | |
|---|---|---|
| Resin B[2] | 100 | 98.9 |
| Ceresin wax (mp 60-65° C.) | — | 0.1 |
| Polybutylacrylate | — | 0.5 |
| Stabilizer[3] | — | 0.5 |
| Interlaminar shear strength (MPa) | 22.3 | 22.1 |

[2] - Resin B = DERAKANE 411-45 vinyl ester resin
[3] - The copolymer prepared in accordance with Example 1

Following essentially the same procedure, but substituting an unsaturated polyester resin for the vinyl ester resin, the following results are obtained:

| Components | Amounts (g) | |
|---|---|---|
| Resin E[6] | 100 | 98.9 |
| Ceresin wax (mp 60-65° C.) | — | 0.1 |
| Polybutylacrylate | — | 0.5 |
| Stabilizer[3] | — | 0.5 |
| Interlaminar shear strength (MPa) | 18.1 | 20.9 |

[3] - The copolymer prepared in accordance with Example 1
[6] - Resin E = NORSODYNE G 703 unsaturated isophthalic polyester resin

I claim:

1. A stable, low polymerizable monomer emission resin composition comprising:
   a) a vinyl ester or an unsaturated polyester resin,
   b) a polymerizable monomer,
   c) a film forming wax material,
   d) an adhesion promoter, and
   e) a stabilizer of a copolymer of maleic acid half ester of a polyethylene glycol arid a monoalkenyl aromatic monomer.

2. A composition according to claim 1 wherein the polymerizable monomer is a compound containing —CH=CH$_2$ group.

3. A composition according to claim 2 wherein the film forming wax material is a paraffin wax or a mixture of paraffin waxes.

4. A composition according to claim 3 wherein the adhesion promoter is polybutyl acrylate.

5. A composition according to claim 4 wherein the resin is a vinyl ester resin and the polymerizable monomer is styrene.

6. A composition according to claim 4 wherein the resin is an unsaturated polyester resin and the polymerizable monomer is styrene.

7. A composition according to claim 2 wherein the film forming wax material is a paraffin wax or a mixture of paraffin waxes.

8. A composition according to claim 2 wherein the adhesion promoter is polybutylacrylate.

9. A composition according to claim 8 wherein the resin is a vinyl ester resin and the polymerizable monomer is styrene.

10. A composition according to claim 8 wherein the resin is an unsaturated polyester resin and the polymerizable monomer is styrene.

11. A composition according to claim 1 wherein the resin is a vinyl ester resin, the polymerizable monomer is styrene, the film forming wax material is a paraffin wax or mixture of paraffin waxes, the adhesion promoter is polybutylacrylate, and the stabilizer is a copolymer of maleic acid half ester of a polyethylene glycol and styrene, said stabilizer copolymer having an average molecular weight of 29,000.

12. The composition of claim 11 which has at least a 20% lower styrene emission than a composition which does not contain the nonionic surfactant or copolymer of a maleic acid half ester of a polyethylene glycol and a monoalkenyl aromatic monomer.

13. A method of stabilizing a low polymerizable monomer emission resin composition comprising a vinyl ester or unsaturated polyester resin, a polymerizable monomer, a film-forming wax material, and an adhesion promoter, by the addition to said resin composition of from 0.05 to 5% by weight of a stabilizing agent of a copolymer of maleic acid half ester of a polyethylene glycol and a monoalkenyl aromatic monomer.

14. A method of stabilizing a low styrene emission vinyl ester resin composition according to claim 13 wherein the polymerizable monomer is styrene, the film forming wax material is a paraffin wax, the adhesion promoter is polybutylacrylate and the stabilizing compound is a copolymer of maleic acid half ester of a polyethylene glycol and styrene having an average molecular weight of 29,000.

15. A method according to claim 13 wherein the stabilizing compound is added in the form of a pre-mix to the resin composition.

16. A method of enhancing the reduction of styrene emissions in a vinyl ester or polyester low wax resin system containing styrene as the reactive diluent, which comprises the addition of from 0.05 to 2% by weight of a copolymer of maleic acid half ester of a polyethylene glycol and a monoalkenyl aromatic monomer.

17. A method according to claim 16 wherein the wax is present in an amount of from 0.05 to 2.0% by weight of the total resin composition.

18. The method of claim 17 wherein the reduction of styrene emission is at least 20% over compositions which do not contain the maleic acid half ester of a polyethylene glycol and a monoalkenyl aromatic monomer.

* * * * *